United States Patent [19]

Mielke et al.

[11] Patent Number: 4,817,727
[45] Date of Patent: Apr. 4, 1989

[54] SUBTILLER

[75] Inventors: Lloyd N. Mielke; Leonard L. Bashford, both of Lincoln, Nebr.

[73] Assignee: The United States of America as represented by the Secretary of Agriculture, Washington, D.C.

[21] Appl. No.: 42,086

[22] Filed: Apr. 24, 1987

[51] Int. Cl.⁴ .............................................. A01B 13/08
[52] U.S. Cl. .................................... 172/192; 172/699; 172/730; 172/766
[58] Field of Search ............... 172/699, 700, 720, 192, 172/196, 766, 768, 774, 770, 686, 730

[56] References Cited

U.S. PATENT DOCUMENTS

| | | | |
|---|---|---|---|
| 688,551 | 12/1901 | Selby | 172/155 |
| 2,569,556 | 10/1951 | Collins et al. | 172/700 |
| 2,577,363 | 12/1951 | Poynor | 172/766 |
| 2,726,592 | 12/1955 | Parks | 172/766 |
| 2,762,286 | 9/1956 | Dorsch | 172/699 |
| 3,536,145 | 10/1970 | Clark | 172/766 |
| 3,807,507 | 4/1974 | Hecker | 172/192 |
| 4,141,301 | 2/1979 | Coldren | 172/699 |
| 4,457,381 | 7/1984 | Wetmore | 172/722 |
| 4,548,276 | 10/1985 | Linger | 172/699 |
| 4,580,639 | 4/1986 | Johnson | 172/730 |

FOREIGN PATENT DOCUMENTS

| | | |
|---|---|---|
| 2355802 | 5/1975 | Fed. Rep. of Germany . |
| 1047411 | 10/1983 | U.S.S.R. ............................ 172/730 |

Primary Examiner—Deborah L. Kyle
Assistant Examiner—John W. Eldred
Attorney, Agent, or Firm—M. Howard Silverstein

[57] ABSTRACT

Combination sweep and subtiller having a plurality of leg shanks extending downward from the sweep. Each shank is angled in the direction of travel to push soil toward the center of the sweep, and simultaneously to provide minimal draft. In addition there is a horizontal bend midway between the upper and lower extremities of the shank so that the lower extremity is bent toward the center of the sweep in order to cause a soil fracture plane in the direction of the center of the sweep. The lower end of the shank has a diagonal bend toward the center of the sweep to agitate the soil thereby.

16 Claims, 3 Drawing Sheets

Direction of travel

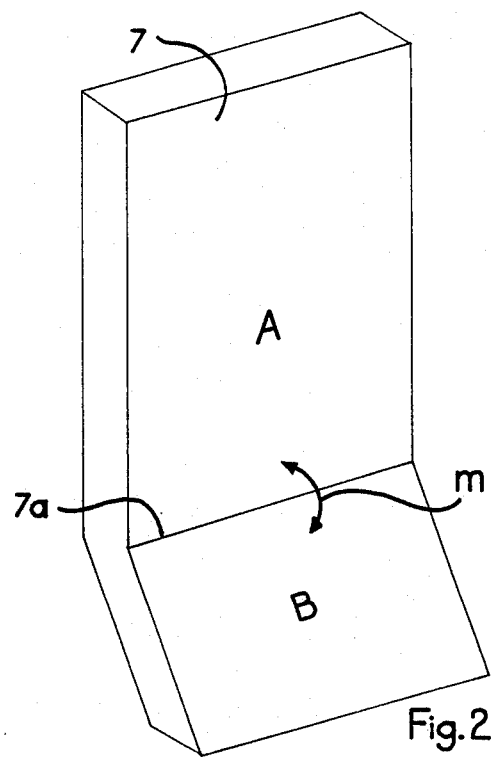
Fig. 2
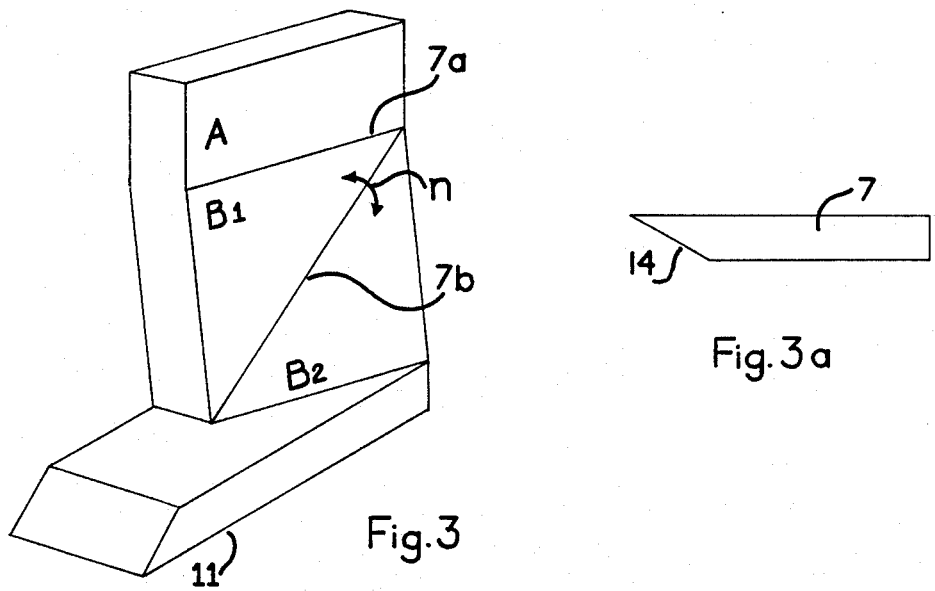
Fig. 3
Fig. 3a

SUBTILLER

FIELD

No-till and reduced till methods and apparatus are well known soil conservation farming expedients. While such expedients help to maintain favorable soil characteristics necessary for sustained crop production, bulk densities of soils treated thereby usually are greater than for conventional tillage, and, as a result, run-off frequently is greater for reduced till or no-till than with conventional tillage.

One of the tools of no-till or reduced till farming is the sweep blade. It is passed through the soil about two to four inches below the surface to undercut standing residue and kill weeds. Sweeps also have been used to incorporate fertilizers and pesticides into the soil. However, repeated sweep operations can create a horizontal shear plane in the soil, i.e., a compacted thin layer, that seals off natural vertical channels and adversely affects water penetration into subsoil, and downward growth of crop roots.

SUMMARY

A new subsurface tiller now has been developed to fracture horizontal shear planes caused by repeated sweep operations and to loosen soil several inches below such shear planes, and thereby decrease the density of such subsoil. Broadly the apparatus comprises a plurality of leg shanks extending downward from a sweep. Each shank comprises an elongated, generally vertical plate having an inner face generally opposite an imaginary vertical plane parallel to the direction of travel of the tiller, which plane passes through the middle point of the sweep; wherein the plate is angled away from the imaginary plane in the direction of travel, wherein this angle is sufficient to cause the inner face of the plate to push soil toward the imaginary plane and thereby create soil agitation, while at the same time the angle is low enough to cause minimal draft; wherein the plate has a horizontal bend about midway between its upper and lower extremities to divide the plate into upper and lower segments in which the upper segment is vertical while the lower segment is bent in the direction of the imaginary plane, wherein the bend is small enough so that the plate maintains its generally vertical configuration, but is sufficient to cause a generally horizontal fracture plane in the soil adjacent the inner plate face, at a right angle to the lower segment, extending from the lower segment's bottom edge toward the imaginary plane for a distance at least as long as the plate's height.

Additionally, the lower segment may include a diagonal bend extending from its lowermost leading point (in the direction of travel) to its uppermost trailing point to define front and rear subsegments in the direction of travel, wherein the rear subsegment is bent in the direction of the imaginary plane, and wherein the angle at the diagonal bend is sufficient to cause additional soil agitation by the rear subsegment without disrupting formation of the generally horizontal fracture plane.

As used in the specification and claims, tillage or soil agitation means that the soil mass is broken up into smaller particles or aggregates.

It is an object of the present invention to destroy the horizontal shear plane created by sweep operations.

Another object is to loosen subsoil without creating horizontal shear planes which result in sealing off natural vertical channels.

A further object is to provide greater soil volume for storage of precipitation before run-off begins.

A still further object is to preserve all the advantages of no-till or reduced till farming with regard to the upper layer of soil and residue, and yet enhance the properties of the subsoil.

An additional object is to decrease the bulk density of subsoil.

Yet a further object is to increase the ability of the subsoil to receive and retain water.

Yet another object is to provide a tilling device which minimally disturbs the upper layer of soil and thereby does not disturb the wheel tracks caused by the tiller-bearing vehicle. As a result, a specific vehicle path is marked out for future farming operations, thus controlling traffic patterns in the field.

DRAWING

FIGS. 1a and b are front and top views, respectively, of the present invention.

FIG. 2 is view of one of the shanks 7 in FIGS. 1a and b.

FIG. 3 is a preferred embodiment of shank 7.

FIG. 3a is a top view of the upper part of shank 7.

DETAILED DESCRIPTION

Figure 1B:
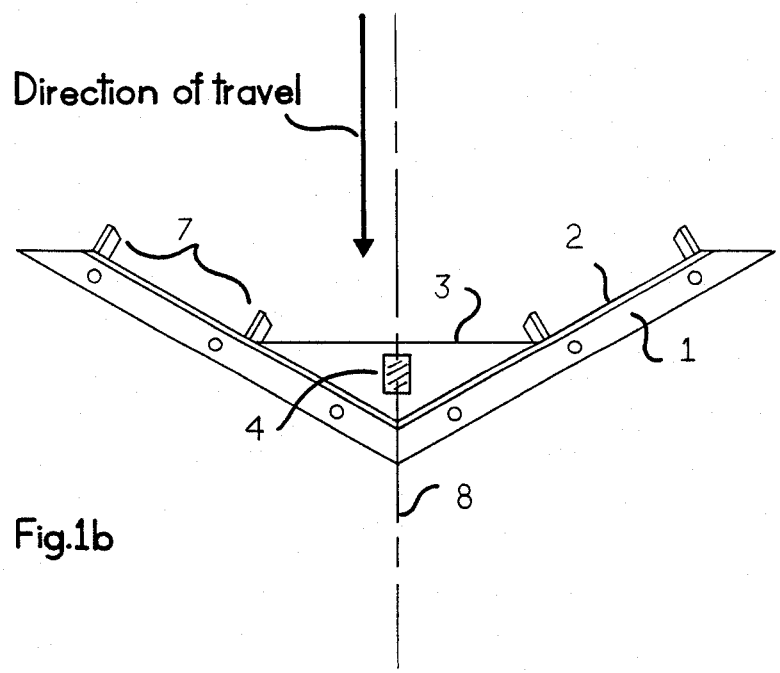
Figure 1A:
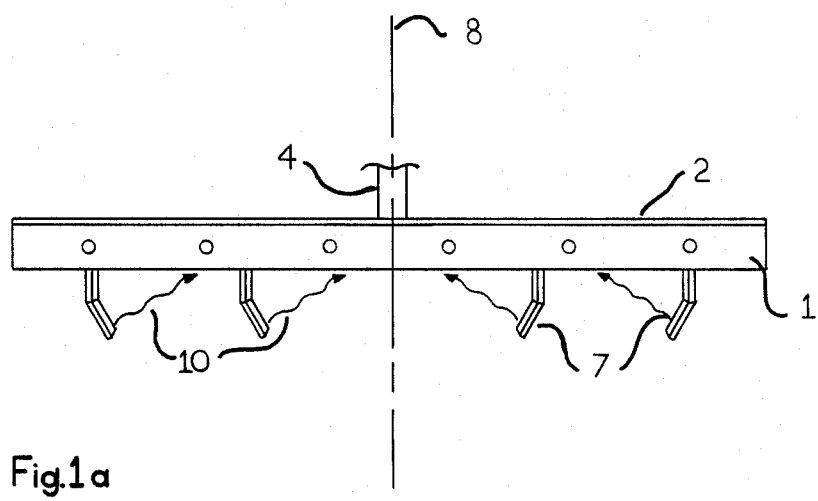

Referring to FIGS. 1a and b, reference numeral 1 designates a typical sweep blade as viewed from the front and top, respectively. The blade frequently is about five feet long, tip to tip. It is screwed or otherwise connected to a frame 2 which conforms in shape to the sweep. Also secured to the frame 2 is a plate 3 from which a vertical member 4 upwardly extends for attachment to a tool bar, which in turn attaches to a vehicle such as a tractor. In operation, the sweep ordinarily is positioned about two to four inches below the surface in order to sever weed roots, undercut standing residue or add chemicals to the soil. All these features are known in the prior art.

Welded or otherwise firmly connected to frame 2 are a plurality of leg shanks 7. The leading edge of each shank in the direction of travel is directed away from an imaginary vertical plane 8 parallel to the direction of travel and passing through the middle of the sweep.

The angle between the shank and imaginary plane is such that the shank pushes soil toward the imaginary plane and, at the same time, is small enough to cause minimal draft by the plate. To accomplish this function, this angle generally should be about 5°–30° depending upon the nature of the soil. Preferably, the angle is about 15°–20°, more preferably about 18°.

Referring to FIG. 2, it can be seen that each shank 7 is a steel or steel-like elongated, generally vertical plate. The face of the plate as viewed in this figure, i.e., the inner face, is the one opposite imaginary plane 8 of FIGS. 1a and b. There is a horizontal bend 7a in the plate about midway between its upper and lower extremities, which divides the plate into upper plate segment A and lower segment B. The upper segment essentially is vertical, while the lower segment is slightly bent in the direction of the imaginary plane 8 creating angle m between segments A and B. This angle is sufficient to cause a generally horizontal fracture plane in the soil, at a right angle to lower segment B, extending from segment B's bottom edge toward the imaginary plane for a distance at least as long as the shank's height, as shown schematically by reference numeral 10 in FIG. 1a. In order for lower segment B to cause such a fracture plane, for most soils the angle m should be about 162°–168°, preferably about 165°.

FIG. 3 shows a preferred embodiment of the present invention in which lower segment B includes a diagonal bend extending from its lowermost leading point, in the direction of travel, to its uppermost trailing point, to define front and rear subsegments $B_1$ and $B_2$, in which rear subsegment $B_2$ is bent toward imaginary plane 8. The angle n at the diagonal bend is sufficient to increase soil agitation by means of rear subsegment $B_2$ without disrupting formation of fracture plane 10 (FIG. 1a). For most soils, this angle should be about 160°–170°, preferably about 165°.

To help keep the tool in the ground, a toe plate 11 is welded or otherwise firmly connected to the bottom of each shank as shown in FIG. 3. Its vertical plane generally is parallel to the imaginary plane 8. To enhance its function to keep the shank in the soil, preferably its forward edge is beveled, and it is tilted downward from horizontal in the direction of travel at an angle of about 10°–30°, more preferably about 10°–25°.

To minimize the energy necessary to pull the shanks through the soil, the leading edge of each shank is beveled, as shown at reference numeral 14 of FIG. 3a, which is a top view of the upper segment of the plate.

Typical shank dimensions may be about ½ inch in thickness, about 6–8 inches in height, and about 3 inches wide.

Spacing between shanks depends upon the shank height, the width of the sweep blade and the nature of the operation. Referring to FIGS. 1a and b, for many operations requiring a shank height of about 6–8 inches, the pair of shanks on either side of imaginary plane 8 generally may be spaced apart about 11–15 inches, while the distance between the two shanks closest to the imaginary plane generally may be about 16–22 inches. If the middle two shanks are closer than same, a soil ridge may be formed on the soil surface, which may or may not be desirable.

Some agricultural operations such as wheat culturing may employ shanks of only an inch or two in height, and a spacing of about two inches between shanks.

The shanks may be secured to frame 2 (FIGS. 1a and b) in the prior art manner, e.g., by directly welding to the sweep frame, or by welding to one piece of a two-piece, separable bracket, wherein the other piece of the bracket is welded to the sweep frame. This latter arrangement enables the subtiller to be removed from the sweep simply by separating the pieces of the two-piece bracket.

Each shank may be located partially or completely under a segment of the sweep, or rearward of the sweep as illustrated in FIG. 1b. Rearward positioning is preferred because location of the shank under the sweep tends to catch residue and results in the sweep blade being forced upward.

Figure 4:
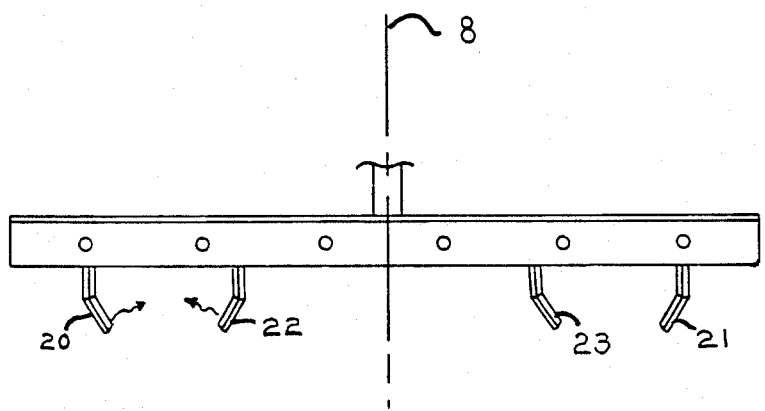
FIG. 4 is an alternative embodiment of the present invention.

As an alternative embodiment, instead of directing the leading edge of each shank away from the imaginary central plane 8 of FIGS. 1a and b, the leading edge of the two inner shanks may be directed toward the central plane, as shown in FIG. 4. In this manner, soil ridges will be formed at the soil surface by the interaction of shanks 20 and 22, and the interaction of shanks 21 and 23, whereby the present invention includes the additional advantage of being a tool for creating ridges.

We claim:

1. A soil subtiller apparatus comprising
   a. a sweep blade;
   b. at least one leg shank extending downward of said sweep blade, wherein said shank comprises an elongated, generally vertical plate having inner and outer faces, wherein said inner face generally is opposite an imaginary vertical plane parallel to the direction of travel of said apparatus, said plane passing through the middle of said sweep blade; wherein said plate's leading edge is angled away from said imaginary plane in said direction of travel so that said plate pushes soil toward said imaginary plane, wherein said angle is about 5°–30°; wherein said plate has a horizontal bend about midway between said plate's upper and lower extremities to divide said plate into upper and lower segments in which said upper segment is vertical and said lower segment is bent toward said imaginary plane; wherein said bend forms an angle between said upper and lower segments which is small enough so that said plate maintains its generally vertical configuration, but is sufficient enough to cause a generally horizontal fracture plane in said soil adjacent said inner face, at a right angle to said lower segment, extending from said lower segment's bottom toward said imaginary plane for a distance at least as long as said plate's height.

2. The apparatus of claim 1 further comprising a diagonal bend in said lower plate segment extending from said lower segment's lowermost leading point in said direction of travel to its uppermost trailing point to define front and rear subsegments in which said rear subsegment is bent toward said plane; wherein said diagonal bend is sufficient to cause said rear subsegment to create additional soil agitation without disrupting formation of said fracture plane.

3. The apparatus of claim 1 wherein said horizontal bend is at an angle of about 162°–168° between said upper and lower segments, and wherein said angle between said plate and imaginary plane is about 15°–20°.

4. The apparatus of claim 1 wherein said horizontal bend is at an angle of about 165° between said upper and lower segments, and wherein said angle between said plate and imaginary plane is about 18°.

5. The apparatus of claim 2 wherein said shank is rearward of that part of said sweep blade where said shank extends downward.

6. The apparatus of claim 2 wherein said horizontal bend is at an angle of about 162°–168° between said upper and lower segments, wherein said angle between said plate and imaginary plane is about 15°–20°, and wherein said diagonal bend is at an angle of about 160°–170° between said front and rear subsegments.

7. The apparatus of claim 5 wherein said horizontal bend is at an angle of about 162°–168° between said upper and lower segments, wherein said angle between said plate and imaginary plane is about 15°–20°, and wherein said diagonal bend is at an angle of about 160°–170° between said front and rear subsegments.

8. The apparatus of claim 5 wherein said sweep includes at least two shanks on each side of said imaginary plane.

9. The apparatus of claim 6 wherein the angle at said horizontal bend is about 165°, and wherein the angle between the plate and imaginary plane is about 18°.

10. The apparatus of claim 7 wherein the angle at the horizontal bend is about 165°, and wherein the angle between the plate and imaginary plane is about 18°.

11. The apparatus of claim 8 wherein each shank includes a toe plate at the bottom thereof.

12. The apparatus of claim 8 wherein the angle at said horizontal bend is about 162°–168° between the upper and lower segments, wherein the angle between the plate and imaginary plane is about 15°–20°, and wherein the diagonal bend is at an angle of about 160°–170° between the front and rear subsegments.

13. The apparatus of claim 8 wherein the leading edge of each shank adjacent the outermost shanks on each side of said imaginary plane is directed toward said imaginary plane so that the two outermost shanks on each side of said imaginary plane form soil ridges at the surface of the soil.

14. The apparatus of claim 11 wherein the angle at said horizontal bend is about 162°–168° between the upper and lower segments, wherein the angle between the plate and imaginary plane is about 15°–20°, and wherein the angle at the diagonal bend is about 160°–170° between the front and rear subsegments.

15. The apparatus of claim 12 wherein the angle at the horizontal bend is about 165°, and wherein the angle between the plate and imaginary plane is about 18°.

16. The apparatus of claim 14 wherein the angle at the horizontal bend is about 165°, and wherein the angle between the plate and imaginary plane is about 18°.

* * * * *